Patented May 11, 1948

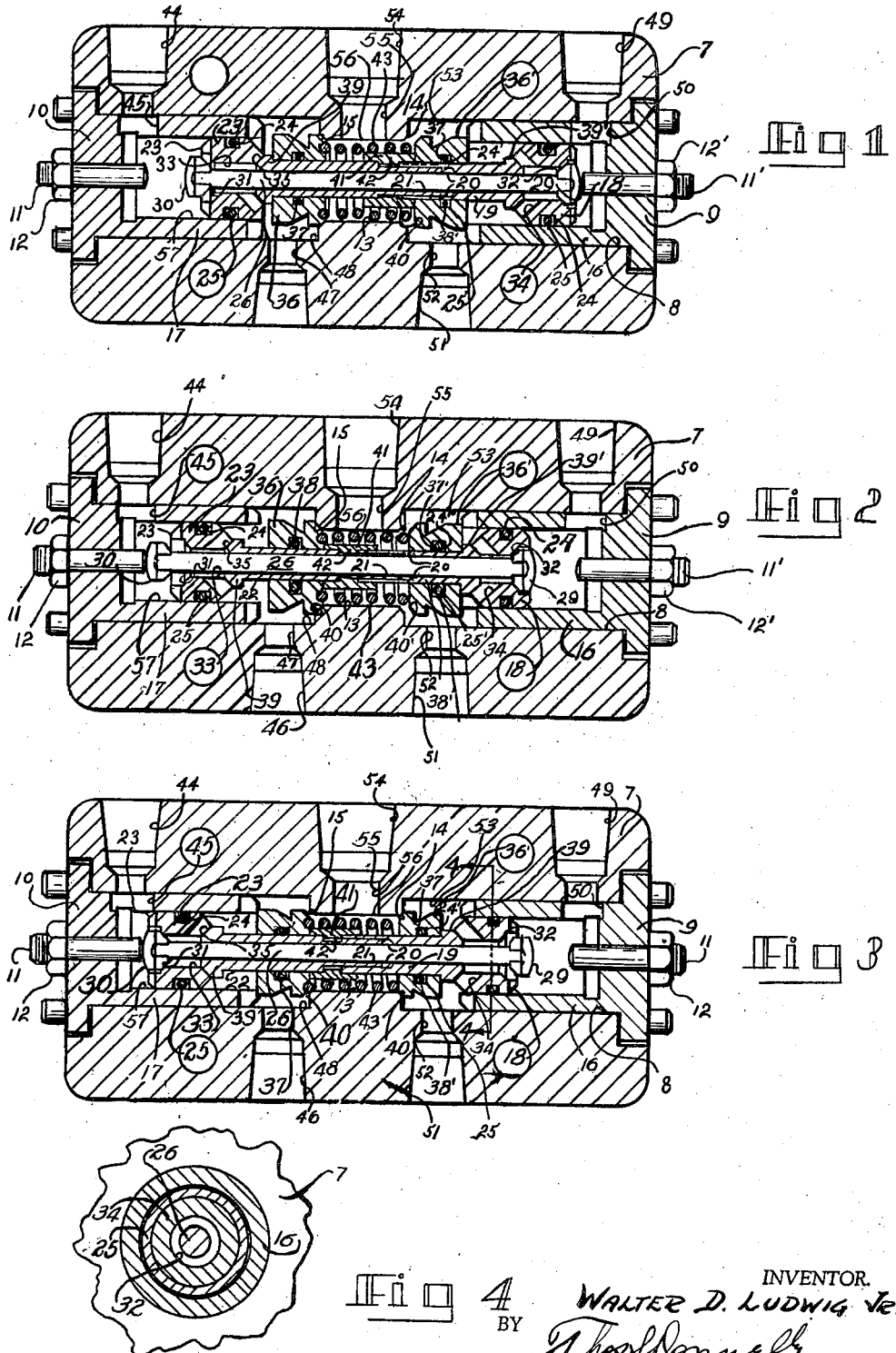

2,441,201

UNITED STATES PATENT OFFICE 2,441,201

VALVE

Walter D. Ludwig, Jr., Detroit, Mich.

Application September 6, 1943, Serial No. 501,434

3 Claims. (Cl. 137—145)

My invention relates to a new and useful improvement in a valve. The valve is adapted for various functions, and in connection with various types of machines, as will appear obvious from a description of the structure disclosed. It is particularly adapted for use on a stitch welder, on which the closing and opening of the electrodes is accomplished by means of air pressure. In the use of this mechanism with such a machine, the operation is entirely automatic after the initial start has been made by opening of a 3-way valve.

It is an object of the present invention to provide a valve having sliding poppets operating as exhaust valves, free to move independently of the inlet control valves.

It is another object of the invention to provide a valve of this type having a piston forming a plurality of valves co-operating with independently-sliding poppet valves.

It is another object of the invention to provide a valve mechanism whereby the inlet and outlet may be automatically controlled through a piston slidably mounted and co-operating with spring-actuated piston valves.

Other objects will appear hereinafter.

It is recognized that various modifications and changes may be made in the structure disclosed without departing from the spirit of the invention, and it is intended that such variations may be embraced within the scope of the claims forming a part hereof.

Forming a part of this specification are drawings in which

Fig. 1 is a longitudinal, horizontal, central, sectional view of the invention showing the valve mechanism in one position.

Fig. 2 is a longitudinal, horizontal, central, sectional view of the invention showing the valve mechanism in another position.

Fig. 3 is a longitudinal, horizontal, central, sectional view of the invention showing the valve mechanism in another position.

Fig. 4 is a sectional view taken on line 4—4 on Fig. 3.

As shown in the drawings, I use a housing 7, through which is formed a bore 8, closed at opposite ends by the caps 9 and 10. Through each of these caps is extended a stud 11, on which is threaded the nut 12 so that the stud may be moved inwardly or outwardly as desired to vary the speed of the stroke. A constricted portion 13 is formed centrally of the bore 8 to provide, at its opposite ends, the valve seats 14 and 15.

Preferably formed integrally with the cap and projecting inwardly therefrom is the tube 16. A similar tube 17 is secured to and projects inwardly from the cap 10, these tubes in operation forming a cylinder. Slidably mounted in the tube or cylinder 16 is the piston head 18, projecting inwardly from which is the tubular stem 19, having the bore counterbored as at 20 to receive the reduced end 21 of a stem 22 which projected inwardly from the cylinder head 23. Formed in these heads is a groove 24 for reception of suitable packing or sealing means 25.

Extending through the piston heads and through the tubular piston rods is a connecting rod 26, having a head 29 at one end and a head 30 at the other end, with an inclined face adapted for seating on the seat forming surface 31 and 32, formed on the piston heads. Each of the heads is provided at this end with a socket 33. A passage 34 is formed through the head 18, communicating with the socket 33, and a similar passage 35 is formed in the head 23, communicating with the socket 33.

Slidably mounted on the tubular rod 22 is a poppet valve head 36, having an internal groove 37 in which suitable sealing means 38 is deposited. The face of this valve head 36 is adapted to bear against the shoulder 39 formed on the tubular rod 22. An inclined surface 40 is formed on the opposite face. A similar poppet valve 36', similarly constructed to the poppet valve 36 and having corresponding parts bearing corresponding prime members is slidably mounted on the tubular member 19 on which is formed the shoulder 39 prime.

Embracing the ends of the tubes 19 and 22 is a sleeve 41, counterbored at its opposite ends to provide a shoulder 42 at the center thereof, against which the ends of the tubular rods or sleeves 19 and 22 engage.

Embracing the ends of the tubular rods 19 and 22, and the sleeve 41, and engaging at opposite ends against the opposite faces of the poppet valves 36 and 36' is a coil spring 43.

An inlet port 44 is formed in the housing 7 in registration with an opening 45 formed in the sleeve 17.

An outlet port 46 is formed in the housing communicating through the passage 47 with the chamber 48.

An inlet port 49 is formed in the housing in registration with an opening 50 formed in the sleeve 16.

An outlet port 51 is formed in the housing communicating through the passage 52 with the chamber 53.

An exhaust port 54 is formed in the housing communicating through the passage 55 with the chamber 56.

When the valve mechanism is in the position shown in Fig. 1, the inlet port 44 and outlet port 46 are in communication with each other, and the outlet port 51 and the exhaust port 54 are in communication with each other, and the inlet port 49 is shut off by the valve head 29. The inlet port 44 communicates with the outlet port 46 through the opening 45, the chamber 57, the space 33, the passage 35 and the chamber 48. The exhaust port 54 is in communication with the outlet port 51 to permit a return through the passage 52, the chamber 53, the chamber 56 and the passage 55.

When the valve mechanism has moved to the position shown on Fig. 3, the outlet port 46 and the exhaust port 54 are in communication with each other, the inlet port 44 is shut off and the inlet port 49 is in communication with the outlet port 51.

Fig. 2 shows the position of the valve mechanism in the intermediate stage, in which the inlet port 44 is still in communication with the outlet port 46, as shown in Fig. 1, and in which the exhaust port 54 is still in communication with the inlet port 51, as shown in Fig. 1.

It will be noted that the valve head 29 in Fig. 1 is in a closed position. It reaches this position when the piston has travelled to the right its maximum distance. The fluid entering the inlet ports 49 and 44 may or may not be under the same pressure. Generally this will be obtained from a common source of supply. When the valve head 30 moves to closing position, pressure is immediately built up in the chamber 57, moving the valve mechanism to the left, as shown in Fig. 2, until the valve head 29 is brought into contact with the stud 11, at which time the shoulder 62 will engage the face of the poppet valve 36', the shoulder 39 having withdrawn from engagement with the face of the poppet valve 36. Further movement will force the head 29 into closing position and move the head 30 into open position, the valve seat 40' seating on the valve seat 15, so that the parts are moved to the position shown in Fig. 3. When this position is reached, the pressure will begin to develop in the reduced chamber 57 to cause a reverse travel of the piston and all of the valve mechanism. Thus the valve mechanism is completely automatic and the communication of the ports 44 and 46 with each other may alternate with the communication of the ports 49 and 51 with each other, the proper establishment of the port of communication between the port 54 and the ports 46 and 51 for return purposes being alternately shown.

The spring 43 functions to retain the poppet valve 36 and 36' in their proper positions. For instance, in Fig. 1, the poppet valve 36' is shown in the non-closing position. The spring 43 serves to retain this valve in the non-closing position, so that the return flow of fluid will not force the valve 36', against the operation of the spring 43 into closing position. The spring also serves to prevent the poppet valve from moving in response to the friction between the poppet valve and the tubular member 19 or 33, as the case may be.

The construction is one which is simple in operation, possessed of a minimum number of parts, and one which can be arranged into compact form.

What I claim as new is:

1. A valve construction of the class described comprising a housing having a longitudinal bore therethrough, a first inlet port communicating with one end of the bore, a second inlet port communicating with the other end of the bore an exhaust port communicating with said bore between said inlet ports, a first outlet port communicating with said bore between said first inlet port and the exhaust port, a second outlet port between the second inlet port and the exhaust port, a pair of valve seats in the bore, one between each outlet port and the exhaust port, a piston means slidable in the bore having a first piston head between the first inlet and outlet ports and a second piston head between the second inlet and outlet ports, a passage through each piston head establishing communication between its opposite sides, a first pair of valves, one controlling the flow through the passage in the first piston head the other controlling flow through the passage in the other piston head, a second pair of valves slidably carried by said piston means and arranged so that each of the valves, respectively, coacts with one of the bore valve seats to control the flow between an outlet port and the exhaust port, means associated with the piston head valves and so arranged that but one of said piston head valves may seat at a time, the entire organization being so constructed and arranged that when the valve associated with the first piston head is closed the second piston head valve will be opened causing movement of the piston means away from the first inlet to effect seating of the valve controlling flow between the first outlet port and exhaust port, opening of the valve controlling flow between the second outlet port and the exhaust port and subsequent opening of the valve associated with the first piston head and closing of the valve associated with the second piston head thereby reversing the direction of movement of the piston means.

2. A valve construction of the class described comprising a housing having a longitudinal bore therethrough, a first inlet port communicating with one end of the bore, a second inlet port communicating with the other end of the bore an exhaust port communicating with said bore between said inlet ports, a first outlet port communicating with said bore between said first inlet port and the exhaust port, a second outlet port between the second inlet port and the exhaust port, a pair of valve seats in the bore, one between each outlet port and the exhaust port, a piston means slidable in the bore having a first piston head between the first inlet and outlet ports and a second piston head between the second inlet and outlet ports, a passage through each piston head establishing communication between its opposite sides, a first pair of valves, one controlling the flow through the passage in the first piston head the other controlling flow through the passage in the other piston head, a second pair of valves slidably carried by said piston means and arranged so that each of the valves, respectively, coacts with one of the bore valve seats to control the flow between an outlet port and the exhaust port, said second pair of valves being spaced apart and positioned on opposite sides of the exhaust port, and a spring positioned between said spaced apart valves and bearing at its opposite ends against said valves for delivering thrusts from one to the other, means associated with the piston head valves and so arranged that but one of said piston head valves may seat at a time, the entire organization being so constructed and arranged that when the valve associated with the first piston head is closed the second piston head valve will be opened causing movement of the piston means away from the first inlet to effect seating of the valve controlling flow between the first outlet port and exhaust port, opening of the valve controlling flow between the second outlet port and the exhaust port and subsequent opening of the valve associated with the first piston head and closing of the valve associated with the second piston head thereby reversing the direction of movement of the piston means.

3. A valve construction of the class described comprising a housing having a longitudinal bore therethrough, a first inlet port communicating with one end of the bore, a second inlet port communicating with the other end of the bore an exhaust port communicating with said bore between said inlet ports, a first outlet port communicating with said bore between said first inlet port and the exhaust port, a second outlet port between the second inlet port and the exhaust port, a pair of valve seats in the bore, one between each outlet port and the exhaust port, a piston means slidable in the bore having a first piston head between the first inlet and outlet ports and a second piston head between the second inlet and outlet ports, a passage through each piston head establishing communication between its opposite sides, a first pair of valves, one controlling the flow through the passage in the first piston head the other controlling flow through the passage in the other piston head, a second pair of valves slidably carried by said piston means and arranged so that each of the valves, respectively, coacts with one of the bore valve seats to control the flow between an outlet port and the exhaust port, said second pair of valves being spaced apart and positioned on opposite sides of the exhaust port, and a spring positioned between said spaced apart valves and bearing at its opposite ends against said valves for delivering thrusts from one to the other, a pair of abutment members each adapted for engaging the face of one of said spaced apart valves for directing thrusts toward the other upon movement of said piston means a predetermined distance, means associated with the piston head valves and so arranged that but one of said piston head valves may seat at a time, the entire organization being so constructed and arranged that when the valve associated with the first piston head is closed the second piston head valve will be opened causing movement of the piston means away from the first inlet to effect seating of the valve controlling flow between the first outlet port and exhaust port, opening of the valve controlling flow between the second outlet port and the exhaust port and subsequent opening of the valve associated with the first piston head and closing of the valve associated with the second piston head thereby reversing the direction of movement of the piston means.

WALTER D. LUDWIG, JR.

REFERENCES CITED

The following references are of record in the file of this patent:

UNITED STATES PATENTS

| Number | Name | Date |
|---|---|---|
| 2,022,005 | Leonard | Nov. 26, 1935 |
| 2,273,679 | Westberg | Feb. 17, 1942 |